United States Patent Office 2,792,604
Patented May 21, 1957

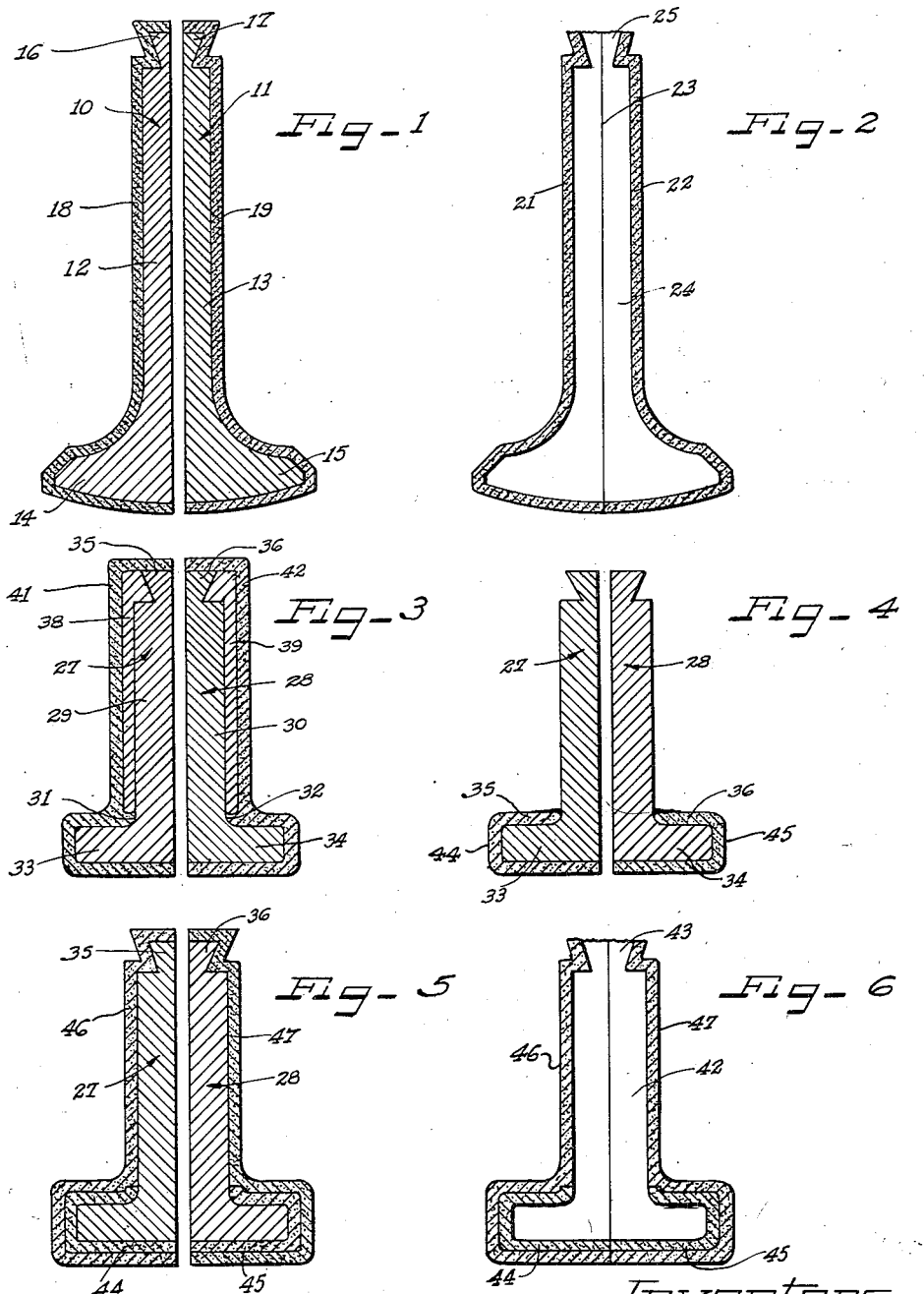

2,792,604

METHOD OF MAKING SHELL MOLDS

Kenneth M. Bartlett, South Euclid, and John C. Sawyer, Cleveland Heights, Ohio, assignors to Thompson Products, Inc., Cleveland, Ohio, a corporation of Ohio Application June 2, 1952, Serial No. 291,272

1 Claim. (Cl. 22—193)

The present invention is concerned with a method of making an improved, porous shell mold for precision casting.

In the past, shell molds have been made by mixing finely divided silica sand with a thermosetting resinous binder, applying the mixture as a coating to a pattern, and then heating the coated pattern at a temperature and for a time sufficient to set the resinous binder into an infusible resin bonding the silica particles together. The resulting mold, when stripped from the pattern, presents a very accurate reproduction, in reverse, of the contour of the pattern, and has a sufficiently high porosity so that gases occluded with the molten metal being poured into the mold can readily escape, thereby preventing or minimizing the formation of blowholes. Shell molds of the type described, however, have the disadvantage of relatively low thermal conductivity, so that molds of this type are not particularly suited to the manufacture of chilled castings. Another disadvantage of the conventional type of shell molds is their chemical reactivity with molten metals. The silica in the mold structure combines rather readily with certain metals, particularly alloys containing high percentages of chromium, producing what is known as a "scabbing."

In the process of the present invention, improved non-reactive shell molds suitable for chill casting are prepared by employing metallic particles to replace in whole or in part the silica sand or other refractory particles ordinarily employed in the manufacture of shell molds. We have found that molds of this type, consisting of metallic particles and a cured thermosetting sesin binder, with or without the addition of refractory particles have a strength equal to or greater than the strength of comparable molds produced from silica (sand), are non-reactive to molten alloys, and have good thermal conductivity. One important aspect of the present invention resides in the fact that molds can be produced which have areas of different thermal conductivities, by varying the portions of metallic powers in the selected areas in the manufacture of the mold. Thus, for example, structural elements which have portions to be chilled during casting and other portions which should be cooled relatively slowly can be produced readily in a mold of this type.

An object of the present invention is to provide a strong, chemically non-reactive shell mold of good thermal conductivity.

Another object of the present invention is to provide a method for the manufacture of porous shell molds including metallic powders bonded together by a set, thermosetting resin.

Another object of the present invention is to provide a method for the manufacture of improved shell molds in which selected areas of the mold are provided with facings of different degrees of thermal conductivity.

Another object of the present invention is to provide a process for the manufacture of improved shell molds from generally spheroidal shaped metal particles.

The type of metal particles to be employed in manufacturing the shell mold of the present invention will depend to a large extent upon the nature of the metal or alloy to be cast into the completed mold. Because of the high thermal conductivity of the completed shell mold, the metal particles making up the mold need not have a melting point in excess of the melting point of the molten metal or alloy being cast. Metals suitable for the practice of the present invention include elemental metals such as molybdenum, and aluminum, and alloys such as brass and stainless steel. The use of molybdenum particles is particularly indicated, because of their refractory nature, for the casting of refractory metals such as titanium.

In a preferred embodiment of the present invention, the metal particles making up the shell mold are generally spheroidal in shape, thereby providing a maximum amount of void space between the particles making up the shell mold. Such spheroidal particles may be produced by atomizing the molten metal or alloy and by conducting the molten metal or alloy in a fine stream into contact with a high pressure water jet to form rounded particles including small spheres of the metal. Any oxidation which occurs during this atomizing treatment can be eliminated by a reduction in a hydrogen atmosphere.

Other objects and features of the present invention will be apparent to those skilled in the art from the following description of the attached sheet of drawings which illustrate two modified forms of the present invention.

In the drawings:

Figure 1 is a longitudinal sectional view illustrating a pair of patterns for a valve, coated with the mold forming composition;

Figure 2 is a sectional view of the completed mold assembly produced from the patterns of Figure 1;

Figure 3 is a sectional view of a pair of patterns which cooperate to define the pattern for a tappet, this drawing illustrating the manner in which portions of the patterns are masked during application of the mold-forming compositions;

Figure 4 is a view similar to Figure 3 and illustrates the patterns after the mask has been removed;

Figure 5 is a sectional view of the patterns after the second coating of the mold-forming compositions have been applied; and Figure 6 is a sectional view of the completed mold assembly for casting tappets.

As shown on the drawings:

The drawings of Figures 1 and 2 have been used to illustrate the manufacture of a mold for the manufacture of poppet valves for internal combustion engines. A pair of pattern halves 10 and 11 which cooperate to define the shape of the ultimate molding cavity in the shell mold have stem portions 12 and 13, respectively, and head portions 14 and 15, respectively. Each of the patterns 10 and 11 also has a half sprue portion, these sprue portions being identified at 16 and 17, respectively.

The patterns 10 and 11 are heated to a temperature of about 300 to 400° F. and the parting medium, such as paraffin, silicone emulsions and greases, is applied to the surfaces of the patterns in liquid form. The patterns are then coated with a mold-forming composition including metal particles and a thermo-setting resinous binder. The preferred binder in the practice of the present invention is a phenol-formaldehyde condensation product in the unset condition, or in the "A" stage. In addition to the metal particles, the mold-making composition may also include ceramic particles such as silica sand, magnesia, alumina, zircon, zirconia and the like, where the chill casting characteristics are to be tempered.

The portions of metal particles plus ceramic particles in the mix may vary from about 85% to about 99.5% by weight, the remainder of the composition consisting of the plastic binder. The binder itself is composed of the phenolic condensation product and a source of formaldehyde, such as hexamethylene tetramine, the usual proportions being 90% of the phenolic resin and 10% of hexamethylene tetramine.

As shown in Figure 1, each of the patterns 10 and 11 is provided with a coating of the metallic particle-containing mold-forming composition, the coatings being identified by the reference numerals 18 and 19. The thickness of the coating will ordinarily be on the order of 1/16 to 3/16 of an inch.

After the coatings 18 and 19 have been applied to the patterns, the coated patterns are introduced into a furnace maintained at a temperature sufficient to set the thermosetting binder. Ordinarily, temperatures of about 450 to 650° F. and times of about 1 to 10 minutes are suitable. The hexamethylene tetramine included in the binder liberates ammonia and formaldehyde by thermal decomposition, the formaldehyde reacting with unreacted phenol in the resin, and the liberated ammonia acting as a basic catalyst for the condensation reaction. During this treatment the phenolic resin becomes set into an infusible state, binding the metal particles and any ceramic particles included together into a rigid, porous mold structure.

The resulting mold assembly, after removal of the pattern, is illustrated in Figure 2 of the drawings. The mold assembly includes a pair of complementary mold sections 21 and 22 which are clamped together along a parting line 23 to provide a molding cavity 24 having the shape of the poppet valve. A portion of the coatings on the patterns 10 and 11 is broken away to provide a sprue 25 for the introduction of molten metal into the cavity 24. The position of sprue 25 is exemplary only, since the best position for the sprue depends upon many factors. A good location for the sprue is where the massive section of the casting is to be formed.

In the manufacture of tappets, it is desirable to provide the head of the tappet with sufficient hardness to resist wear, while making the stem of the tappet tough for increased shock resistance. Thus, chill casting would be indicated for the head of the tappet, while relatively slow cooling would be indicated for the stem. The steps employed in the manufacture of a mold which has portions thereof arranged for chilling rapidly selected portions of the material being cast, while cooling relatively slowly the remainder of the article, are illustrated in Figures 3 to 6 of the drawings. In this form of the invention, a pair of half-patterns 27 and 28, each of which is contoured to provide stem portions 29 and 30, respectively, neck portions 31 and 32, respectively, and enlarged head portions 33 and 34, respectively, are machined from cast iron or other suitable pattern material. The patterns 27 and 28 also have sprue formers 35 and 36 which ultimately form the sprue for the mold assembly. Before the patterns 27 and 28 are coated with the mold-forming compositions, each of the patterns is provided with semi-cylindrical masking sleeves 38 and 39, respectively, the sleeves 38 and 39 extending from around the sprue formers 35 and 36, down the stem portions 29 and 30 and up to the neck portions 31 and 32 of the respective patterns. With the sleeves 38 and 39 securely in place, the patterns 27 and 28 are then coated with a mold-forming composition preferably consisting solely of the metallic particles and the resinous binder. This composition is applied to the patterns with the masking shields 38 and 39 in place, resulting in the formation of continuous coatings 41 and 42 overlying the masks and directly in contact with the head portions 33 and 34 of the patterns. Next, the patterns, together with the masking shields and the superimposed coatings are introduced into the furnace, where the resinous component of the mold-making composition is set into an infusible form. After the articles are withdrawn from the furnace, the rigidified, set coatings 41 and 42 are broken away from the patterns up to the neck portions 31 and 32 of the patterns, and the masking shields 38 and 49 are removed. The structure which remains is illustrated in Figure 4 of the drawings and includes relatively thin, infusible coatings 44 and 45 about the head portions of the pattern and extending upwardly into the neck portion of the patterns. The coatings 44 and 45 are relatively porous and consist essentially of finely divided metal particles bonded together by the thermoset resin.

The next step of the process consists in forming the remainder of the mold about the uncoated portions of the patterns as illustrated in Figure 4. The patterns 27 and 28 are coated with a second coating having a thermal conductivity less than the thermal conductivity of the coatings first applied. For example, the second coating may consist of metal particles of lower thermal conductivity than the particles employed in the first coating, or the coating may consist of metal particles in combination with ceramic particles, such as silica sand. The patterns 27 and 28 are then coated with coatings 46 and 47 of lower thermal conductivity, the coatings 46 and 47 extending over the exposed surfaces of the pattern, and enveloping the previously set coatings 44 and 45.

The coated patterns are then reintroduced into the furnace, for such time as may be required to set the resinous component of the coatings into an infusible state. Upon leaving the furnace, the patterns 27 and 28 are removed, and the portions of the coatings 46 and 47 over the ends of the sprue portions 35 and 36 are broken away. The resulting shells are then clamped or otherwise secured together to provide a two-piece mold assembly illustrated in Figure 6, and including a molding cavity 42 defined by the cooperating shell mold sections. The set shells 44 and 45 thereby provide facings for the molding cavity of relatively high rate of heat transferability, while the remainder of the shell mold represented by the mold portions 46 and 47 has a heat transfer coefficient substantially less than that of the shells 44 and 45.

Molten metal is introduced into the cavity 42 by means of sprue 43, and, upon flow of molten metal into the portions of the molding cavity surrounded by the shells 44 and 45, the molten metal is quickly chilled while the remainder of the molten metal introduced into the cavity is cooled at a relatively slower rate because of the difference in heat transfer characteristics between the various portions of the mold. The result is the production of a tappet which has a chilled portion of a hardness sufficient to resist wear, while having a tough stem portion for increased shock resistance.

Where the control of the porosity of the mold to a predetermined value is important, the shell molds of the present invention can be filled in with particles of graded size to fill up some of the void spaces in the shell mold walls and thereby reduce the porosity of the mold.

From the foregoing, it will be appreciated that the method of the present invention provides an improved shell mold structure which is particularly adapted to chill casting molten metals and alloys. The molds of the present invention are unreactive chemically to metals and alloys, thereby eliminating one of the disadvantages normally associated with the use of shell molds consisting essentially of sand.

It will be evident that various modifications and variations may be effected without departing from the scope of the novel concepts of the present invention.

We claim as our invention:

The method of making a shell mold having portions therein of different thermal conductivity than other portions of said mold which comprises providing a pattern of the article to be reproduced, applying a mask over those portions of the pattern which are to form the portions of the mold of a given thermal conductivity while leaving exposed portions on the pattern which are to form the portions of the mold having a different thermal conductivity, applying a first coating of refractory particles and a thermosetting resinous binder over said mask and exposed portions, heating the resulting partially coated pattern to a temperature sufficient to set said resinous binder into an infusible state, removing said mask and coating thereon, applying a second coating of refractory particles in a thermosetting binder over portions of said pattern uncoated by said first coating, said second coating having a different thermal conductivity than said first coating, and heating the resulting coated pattern to a temperature sufficient to set the resinous binder of said second coating into an infusible state, one of said coatings having thermal conductivity imparted thereto by the presence of generally spheroidal metal particles.

References Cited in the file of this patent

UNITED STATES PATENTS

| | | |
|---|---|---|
| 2,392,968 | Bell | Jan. 15, 1946 |
| 2,505,507 | Sennholtz et al. | Apr. 25, 1950 |
| 2,544,598 | Kalina | Mar. 6, 1951 |
| 2,568,364 | Duesbury et al. | Sept. 18, 1951 |

FOREIGN PATENTS

| | | |
|---|---|---|
| 585,665 | Great Britain | Feb. 18, 1947 |
| 832,934 | Germany | Mar. 3, 1952 |
| 832,937 | Germany | Mar. 13, 1952 |

OTHER REFERENCES

American Foundryman, January 1952, pages 24–29.